3,345,934
COFFEE BREWING AND SERVING APPARATUS
Robert T. Steiner and George E. Woodis, Minneapolis, Minn., assignors to Griswold Coffee Company, Minneapolis, Minn., a corporation of Minnesota
Filed Oct. 27, 1964, Ser. No. 406,756
3 Claims. (Cl. 99—290)

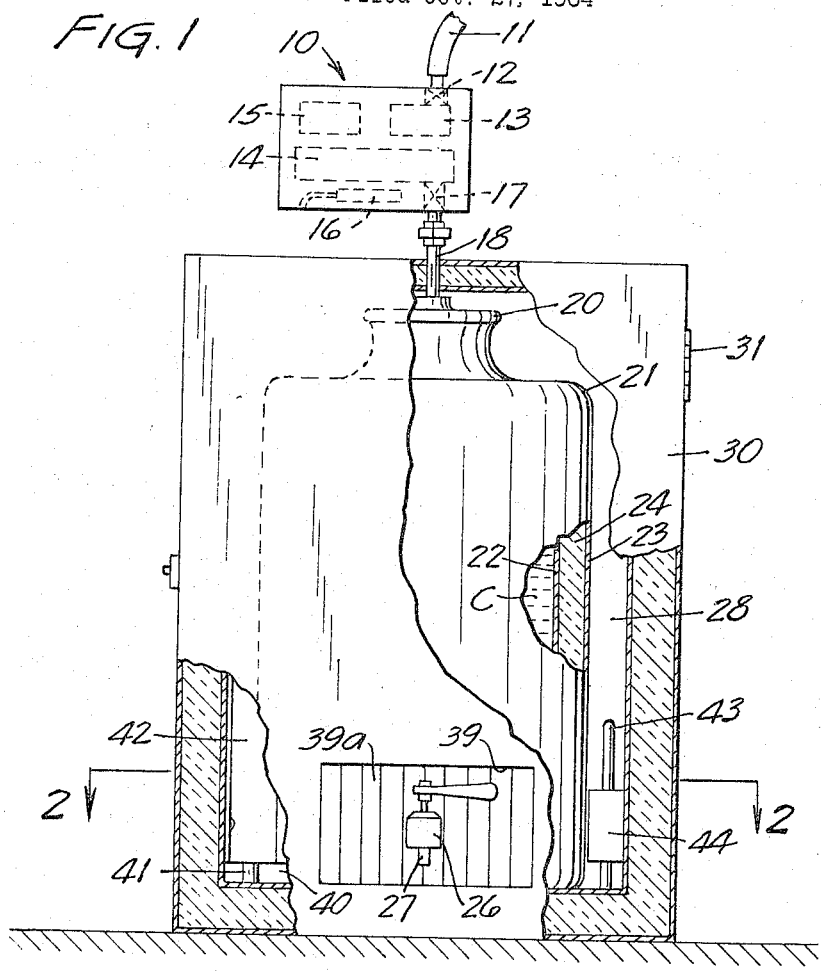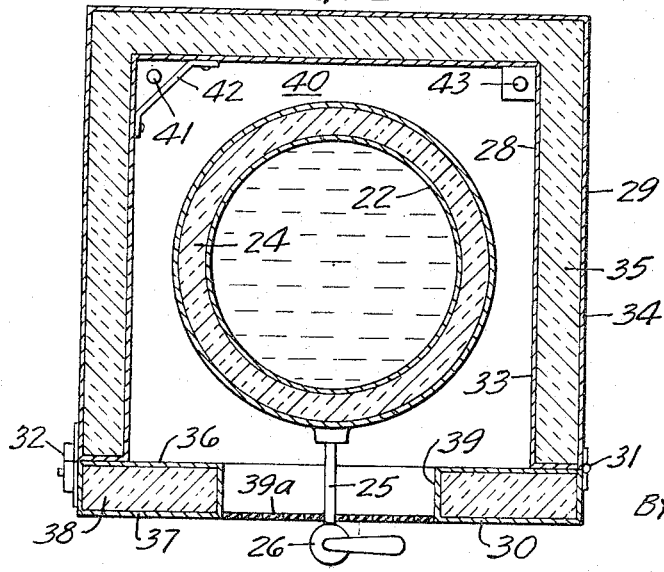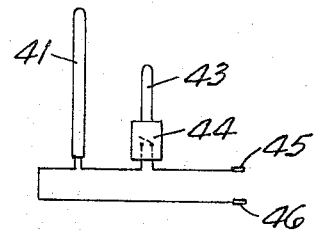

This invention relates to an apparatus for brewing coffee and storing the brewed coffee for a period of time and then serving the coffee.

In dispensing coffee as by coin operated machines and the like, there has been a distinct problem to attempt to dispense highly flavorable coffee at any and all hours. Certain coin operated machines have utilized automatic mechanisms for brewing one cup of coffee at a time, as through the use of "instant" coffee and mixing this with a small amount of water. It will be recognized that many potential customers for coffee served from vending machines do not like the flavor of instant coffee. In other types of vending machines, a mechanism is used to brew a quantity of coffee which is temporarily stored in a container from which the coffee is dispensed cup by cup as required; and the coffee is periodically warmed by an electric heating element or a gas flame while in the container. It should be understood that in such a heating process, the entire quantity of the coffee may be raised in temperature by only a few degrees, but small portions of the coffee which are located just above the source of heat which is applied to the container, are heated to rather high temperatures and then are mixed with the other remaining colder portions of the quantity of coffee. When this coffee is heated by the source of heat, a scorching effect is obtained and the taste of the brewed coffee is changed, often time quite drastically from the original desired brewed coffee flavor. As a result, such coffee will vary considerably in flavor from one time to another, and when the coffee has been freshly brewed, it will taste fairly good and at a later time after the coffee has been reheated, the coffee will have a distinctly different and undesirable flavor.

With these comments in mind it is to be the elimination of these and other disadvantages to which the present invention is directed, along with the inclusion therein of rather novel and desirable features.

An object of the invention is to provide a new and improved coffee serving apparatus of simple and inexpensive construction and operation to facilitate preparation of a multiple cup quantity of brewed coffee through the use of conventional ground coffee beans and to maintain the original desired flavor of the coffee even though the coffee must be stored for a substantial period of time.

Another object of the invention is to provide a novel apparatus for preparation of brewed coffee and for storing such coffee for a substantial period without necessitating reheating of the coffee so as to retain the maximum and desired original flavor of brewed coffee.

These and other objects and advantages of our invention will more fully appear from the following description made in connection with the accompanying drawings, wherein like reference characters refer to the same or similar parts throughout the several views, and in which:

FIG. 1 is a front elevation view of the present invention with a portion of the apparatus illustrated diagrammatically;

FIG. 2 is a detail section view taken approximately at 2—2 in FIG. 1; and

FIG. 3 is a schematic diagram of the thermostatically regulated heater circuit of the present invention.

One form of the present invention is shown in the drawings and is described herein.

Coffee brewing apparatus, indicated in general by numeral 10 and shown diagrammatically, is provided with a source of water 11 controlled by a valve 12, may be delivered to a receptacle 13 for measuring and subsequent application to a coffee brewing container 14. A supply 15 of granular or ground coffee beans is provided, also for measuring and application to the container 14 wherein the coffee may be brewed and heated by a source of heat such as gas burner 16 to a temperature substantially equalling boiling temperature of water, or very nearly approximating 212° degrees F. An outlet or discharging valve 17 controls the discharging of the brewed coffee from the apparatus 10 through a pipe 18, at which point the freshly brewed coffee remains at very nearly boiling temperature, but in any event at a temperature well in excess of the minimum temperature at which coffee may be served. A typical temperature of the coffee at pipe 18 is approximately 210° F.

The pipe 18, through which the freshly brewed coffee is delivered, is also connected into the top or removable cover 20 of a heat confining container 21 of such a size as to receive and carry a multiple cup quantity of coffee, and may be of such a size as to confine two or more gallons. The container 21 may have a stainless steel liner 22 and a stainless steel outer shell 23 which are separated from each other by a space completely filled with a fibrous or expanded foam type of insulation 24. At the bottom of container 21, a dispensing apparatus is provided for discharging the coffee C, and such dispensing means includes a pipe 25 extending into the lower portion of the container and mounting a valve 26 and a dispensing spout 27. Although the valve 26 is shown to be hand operated, a solenoid operated valve or other suitable type of remote control valve may be provided facilitating use of the apparatus in a coin operated vending machine.

The container 21 is confined within the open interior chamber 28 of an enclosure or housing 29 which has a door 30 which is supported by hinges 31 and a latch 32. The enclosure 29 is constructed with a stainless steel liner 33 and a stainless steel outer shell 34 and a heat insulating material 35, such as a glass fiber batt between the inner liner and outer shell.

The door 30 is similarly constructed with an inner liner 36 and an outer shell 37, both of stainless steel sheet material and an insulation 38, such as glass fiber batts therebetween. The door 30 also has an opening 39 through the lower portion thereof across which flexible strips 39a of material such as rubber are suspended to admit passage of the valve 26 therethrough to thereby permit the dispensing spout 27 to be disposed at the exterior of the chamber 28 for convenient dispensing of the coffee from the container 21.

The enclosure 29 confines, in the interior chamber 28 thereof an envelope of heated air 49 which surrounds the container 21. The air is heated by an electric heating element 41 which is of the resistance type and which is mounted in the rear corner of the chamber 28. A protecting panel 42 is affixed as by spot welding to the interior shell 33 of the enclosure and across the corner in protective relation with respect to the resistance heating element 41.

A temperature sensing thermostatic control element 43 is mounted in another corner of the chamber 28 so as to be in sensing relation with the envelope 40 of air within the chamber. The electric resistance heater and the thermostatic control element 43 cooperate to maintain the envelope 40 of heated air in the chamber 28 at a temperature less than the temperature of the coffee entering the container 21 at the pipe 18, that is, less than the boiling temperature for water, but at a temperature well in excess of the minimum temperature at which brewed coffee may be served, and the temperature of the envelope 40 of air within the chamber 28 is maintained at approximately 160° F. This temperature is in excess of the temperature at which most people can drink brewed coffee and therefore it is in excess of the minimum temperature at which coffee can be served at the pouring spout 27 of the container.

Because of the high temperature of the envelope 40 of air within the chamber 28, the coffee in the container 21 is restrained against cooling, and of course the heat of the coffee is confined within the container 21 by the insulation 24 of the container wall so that the air envelope 40 within the chamber 28 absorbs only a minimum of heat from the coffee. It is to be particularly noted that the coffee in this container 21 may be stored for at least 24 hours without losing the original desired flavor of the brewed coffee, and as a practical matter, the coffee can be stored for a period considerably in excess of 24 hours. It will be understood that as the temperature of the coffee C within the container 21 lowers toward the temperature of the envelope 40 of air surrounding the container 21, which is maintained at 160° F., considerably in excess of the minimum temperature at which coffee may be served, the rate of cooling of the coffee C in the container 21 is decreased such that the temperature of the coffee C will not, as a practical matter, ever reach the temperature of 160° F. As a result, it will be seen that there is no heating of the coffee effected after the coffee enters the container 21 after the initial brewing and the heating of the coffee by the brewing apparatus 10. As a result of this lack of any need for heating the coffee after it is brewed and during storage, the original desired flavor of the brewed coffee is maintained.

In FIG. 3, the simple electrical circuit of the control apparatus regulating the temperature of the envelope 40 of air within the chamber 28 is illustrated. The air temperature sensing thermostatic control element 43 operates a switch 44 which is connected in series with the electric resistance heating element 41 to control the application of current and power to the heating element 41 from the power terminals 45 and 46 to which a suitable source of electric power, at a voltage of preferably 115 volts A.C. is applied.

The coffee brewing apparatus may be periodically actuated manually, or may be induced into operation by a sensing device so that additional coffee is brewed when the supply of coffee in the container 21 is running low.

It will be seen that we have provided a new and novel apparatus for brewing coffee and serving the coffee after a delay of period of time which may be several hours and without necessitating reheating the coffee so as to maintain the desired flavor of the coffee without any deterioration of the flavor.

Of course it will be understood that various changes may be made in the form, details, arrangement and proportions of the various parts without departing from the scope of our invention.

What we claim is:

1. Coffee serving apparatus,
comprising means brewing a multiple cup quantity of heated coffee and having an outlet discharging brewed coffee at a first temperature well in excess of the minimum temperature at which brewed coffee may be served,
a closed top insulated container having means in fluid flow communication with said outlet to receive coffee therefrom substantially at said first temperature, discharge means connected with said container for serving brewed coffee and including a valve,
an enclosure defining a chamber confining said container and also confining a heated air envelope surrounding said container,
and means heating and maintaining said air envelope at a second temperature less than said first temperature, but in excess of room temperature,
whereby to facilitate production of a large quantity of coffee and dispensing of the coffee over a substantial period of time without reheating the coffee and thereby maintain the maximum desired original flavor of the brewed coffee.

2. Coffee serving apparatus,
comprising means brewing a multiple cup quantity of heated coffee and having an outlet discharging the brewed coffee at substantially boiling temperature,
a closed top insulated container having means in fluid flow communication with said outlet to receive coffee therefrom at substantially boiling temperature,
discharge means connected with said container to facilitate serving the brewed coffee and including a valve,
an enclosure having a chamber confining said container in an atmosphere with a second temperature less than said boiling temperature but in excess of room temperature,
and thermostatically regulated heating means in the chamber and heating the air and maintaining said air at said second temperature,
whereby to facilitate production of a large quantity of coffee and dispensing of the coffee over a substantial period of time without reheating the coffee and thereby maintain the maximum desired original flavor of the brewed coffee.

3. Coffee serving apparatus,
comprising means brewing a multiple cup quantity of heated coffee and having an outlet discharging brewed coffee at a first temperature well in excess of the minimum temperature at which brewed coffee may be served,
a closed top insulated container having means in fluid flow communication with said outlet to receive coffee therefrom at substantially said first temperature,
dispensing means connected with said container to provide for dispensing said brewed coffee from the container and including a valve and dispensing spout,
an enclosure having a chamber confining said container therein and also confining heated air surrounding said container, said enclosure having a door providing access into said chamber to permit removal of said container, said door having an access port through which the dispensing spout of said dispensing means is movable and thereby facilitate dispensing of the brewed coffee at the exterior of said enclosure,
and thermostatically regulated heating means in the chamber and heating the air and maintaining said air at a second temperature less than said first temperature, but in excess of room temperature to thereby facilitate storing of coffee for a substantial period and serving such coffee without loosing the desired original flavor of the brewed coffee.

References Cited

UNITED STATES PATENTS

| 2,838,077 | 6/1958 | Cooper | 99—279 X |
| 2,890,643 | 6/1959 | King | 99—290 X |
| 3,149,556 | 9/1964 | Martin | 99—291 |
| 3,218,955 | 11/1965 | Lorang | 99—281 X |

FOREIGN PATENTS

| 952,796 | 5/1949 | France. |
| 694,052 | 7/1953 | Great Britain. |

WALTER A. SCHEEL, *Primary Examiner.*

S. B. FISHER, *Assistant Examiner.*